United States Patent [19]
Habert et al.

[11] 3,847,705
[45] Nov. 12, 1974

[54] APPARATUS FOR CONVEYING A TIRE TREAD

[75] Inventors: William Charles Habert, Fraser; Charles Edward Todd, Detroit, both of Mich.

[73] Assignee: Uniroyal, Inc., New York, N.Y.

[22] Filed: Jan. 22, 1973

[21] Appl. No.: 325,693

[52] U.S. Cl. .................. 156/405, 26/54 A, 156/96, 156/128, 156/129, 156/229, 264/40, 264/291, 264/294, 425/325, 425/383
[51] Int. Cl. ..... B29h 17/02, B29h 5/04, B29c 17/02
[58] Field of Search ............ 156/96, 110, 117, 123, 156/128–130, 133, 394, 405, 406, 229; 425/383, 325; 264/40, 148, 151, 291, 294; 26/54, 54 A, 57

[56] References Cited
UNITED STATES PATENTS

| | | | |
|---|---|---|---|
| 1,679,560 | 8/1928 | Burdette | 264/291 |
| 2,690,785 | 10/1954 | McWilliams | 156/128 |
| 3,250,841 | 5/1966 | Reinhart | 425/383 |
| 3,407,106 | 10/1968 | Barefoot | 156/96 |
| 3,591,439 | 7/1971 | Leblond et al | 156/406 |
| 3,607,555 | 9/1971 | Leblond et al | 156/406 |
| 3,728,181 | 4/1973 | Simmons | 156/96 |

*Primary Examiner*—Clifton B. Cosby
*Assistant Examiner*—John E. Kittle
*Attorney, Agent, or Firm*—Charles A. Blank, Esq.

[57] ABSTRACT

Apparatus for conveying a tire tread and for changing the length of the tire tread. One end portion of the tread is fixedly positioned lengthwise along the conveyor and spaced members lift the tread from the conveyor. The spaced members are substantially simultaneously displaced with approximately equal increments of displacement between adjacent members, thereby shrinking or stretching the tread to a desired length.

9 Claims, 16 Drawing Figures

APPARATUS FOR CONVEYING A TIRE TREAD

This invention relates to apparatus for conveying a tire tread and for changing the length of the tire tread. Such apparatus is particularly useful in connection with the building of radial ply tires. The invention also relates to the method of conveying a tire tread and changing the length of the tire tread.

Prior apparatus and methods of conveying a tire tread have, in general, required manual adjustment of the length of the tread prior to the application of the tread to a tire carcass. Also, changes in the length of the tread are ordinarily not uniformly distributed along the length of the tread, causing a non-uniform distribution of the mass of the tread.

It is an object of the present inveniton, therefore, to provide a new and improved apparatus and method for conveying a tire tread and for changing the length of the tire tread.

It is another object of the invention to provide a new and improved apparatus for conveying a tire tread and for stretching or shrinking the tire tread to adjust the length thereof with approximately uniform incremental changes in the length of the tread over the major portion thereof.

In accordance with the invention, apparatus for conveying a tire tread and for changing the length of the tire tread comprises conveyor means for transporting a tire tread and means for fixedly positioning one end portion of the tread lengthwise with respect to the conveyor means. The apparatus includes means having members spaced along the conveyor means for lifting the tread from the conveyor means with the aforesaid members engaging the tread at spaced points therealong. The apparatus also comprises means for driving the aforesaid members along the conveyor means and including resilient means separating the aforesaid members for substantially simultaneously displacing the aforesaid members along the conveyor means relative to each other and relative to the aforesaid one end portion of the tread to displace the points of engagement of the aforesaid members with the tread relative to each other and relative to the aforesaid one end portion of the tread, thereby changing the length of the tread.

Also in accordance with the invention, the method of conveying a tire tread and changing the length of the tire tread comprises the steps of transporting a tire tread along a conveyor and fixedly positioning one end portion of the tread lengthwise along the conveyor. The method also includes the step of lifting the tread from the conveyor at spaced points of support along the tread and the step of substantially simultaneously displacing spaced points of support along the tread relative to each other and relative to the aforesaid one end portion of the tread, thereby changing the length of the tread.

For a better understanding of the present invention, together with other and further objects thereof, reference is made to the following description, taken in connection with the accompanying drawings and its scope will be pointed out in the appended claims.

Referring now to the drawings:

FIG. 6 is a fragmentary plan view of the FIG. 1 apparatus to an enlarged scale, to be taken with the FIG. 5 drawing;

Figure 8:
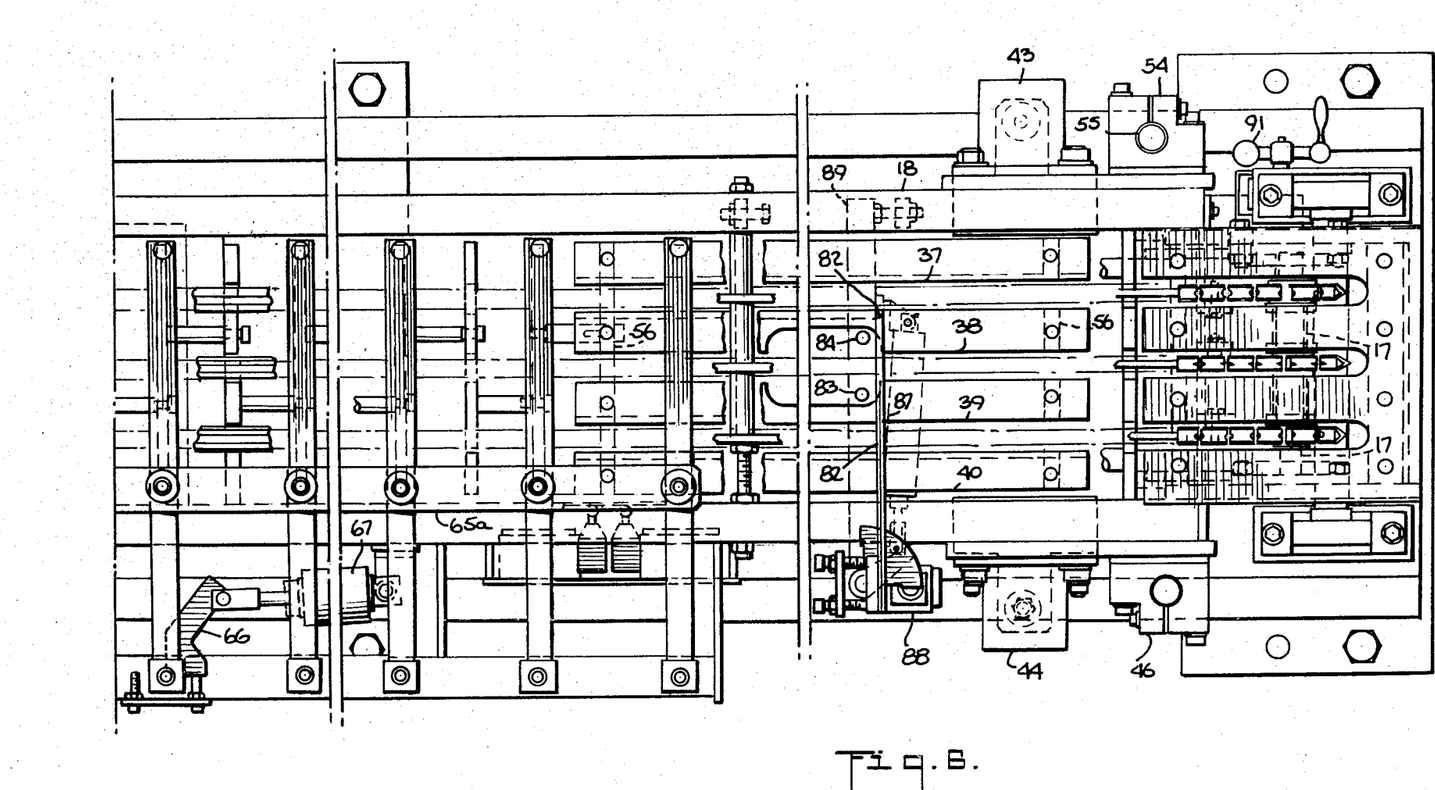
FIG. 8 is a fragmentary view of the FIG. 3 apparatus, taken along line 8—8 of FIG. 3.

Referring now more particularly to FIGS. 1-6 and 8 of the drawings, there is represented apparatus for conveying a tire tread and for changing the length of the tire tread comprising conveyor means 10 for transporting the tire tread. The conveyor means 10 comprises, for example, three chains 11, 12, 13, more clearly seen in FIGS. 5 and 6 mounted for rotation on sprocket wheels 14, 15 (FIGS. 3, 4 and 8) attached to rotatable shafts 16, 17, respectively, mounted for rotation in frame 18 under the drive of a motor 19 coupled thereto through sprocket wheels 20, 21 and an associated chain and clutch 92 represented in FIG. 5. The motor 19 is suspended from the frame 18. As represented in FIG. 8, applicator wheels 108, 109 are rotatably mounted on shaft 16.

The apparatus also includes means for fixedly positioning one end portion of the tread lengthwise with respect to the conveyor means. This positioning means comprises means actuated by the one end portion of the tread for stopping the conveyor means. The means for stopping the conveyor means includes a bar 22 (FIGS. 3 and 5) slidably mounted on support 23 and urged toward the conveyors 11, 12, 13 by springs 24, 25. A limit switch 26 is utilized to stop the drive motor 19 when actuated by movement of the bar 22 against the springs 24, 25, as will be more fully explained hereinafter. A limit switch 27 is utilized as a safety limit switch to be actuated in the event that the limit switch 26 fails to stop the motor 19 upon displacement of the bar 22.

Figure 3:
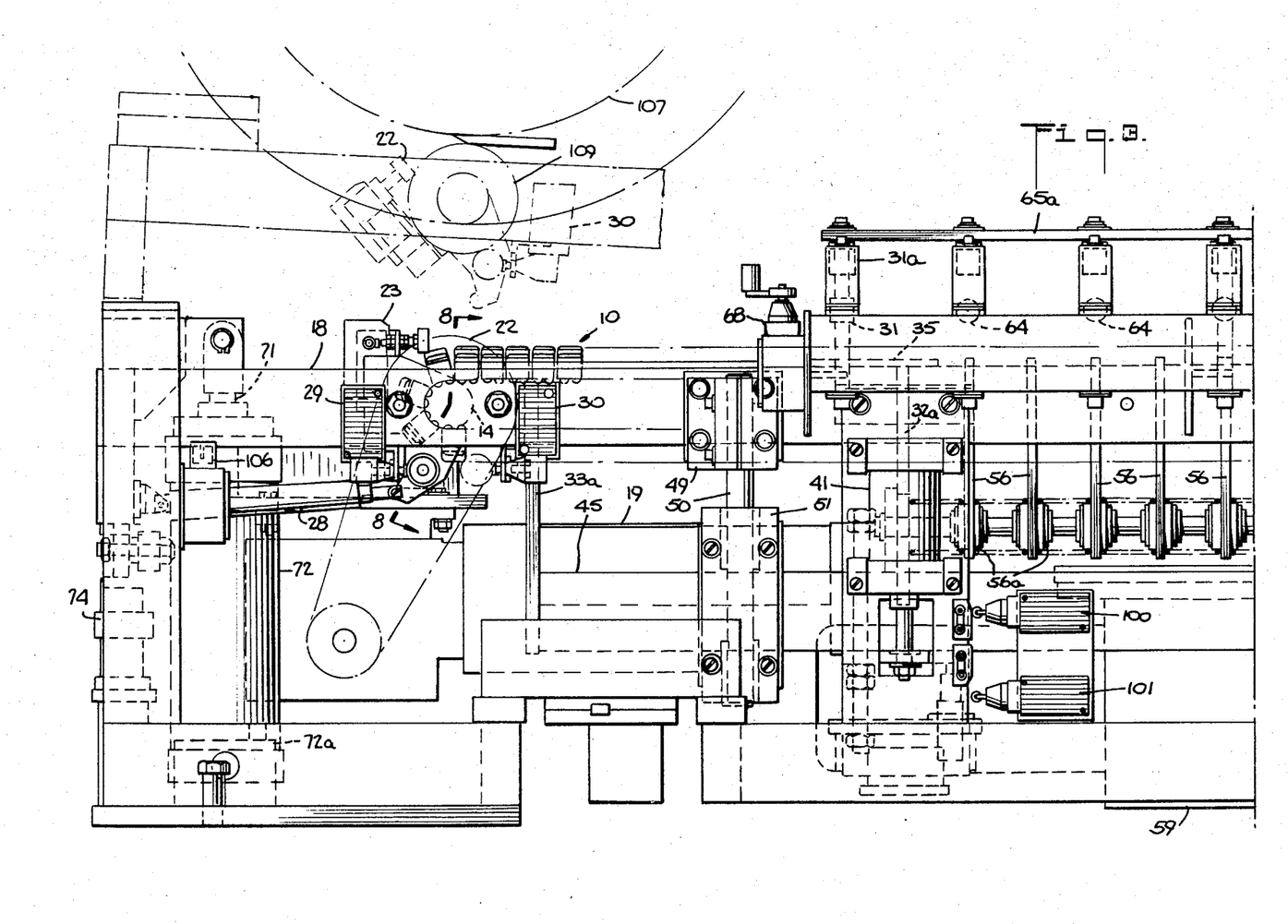
FIG. 3 is a fragmentary view to an enlarged scale of a portion of the FIG. 1 apparatus.

Support 23 is pivotally mounted on the shaft 16 for motion under the control of a pneumatic cylinder 28 to the position represented in broken line construction in FIG. 3 at a time when the frame 18 is raised, as will be described more fully hereinafter. A limit switch 29 is actuated by the support 23 when the support 23 positions the bar 22 for contact with a tread on the conveyor as represented in FIG. 3 in solid line construction. A limit switch 30 is actuated when the bar 22 is moved to the position represented in broken line construction in FIG. 3.

Figure 5:
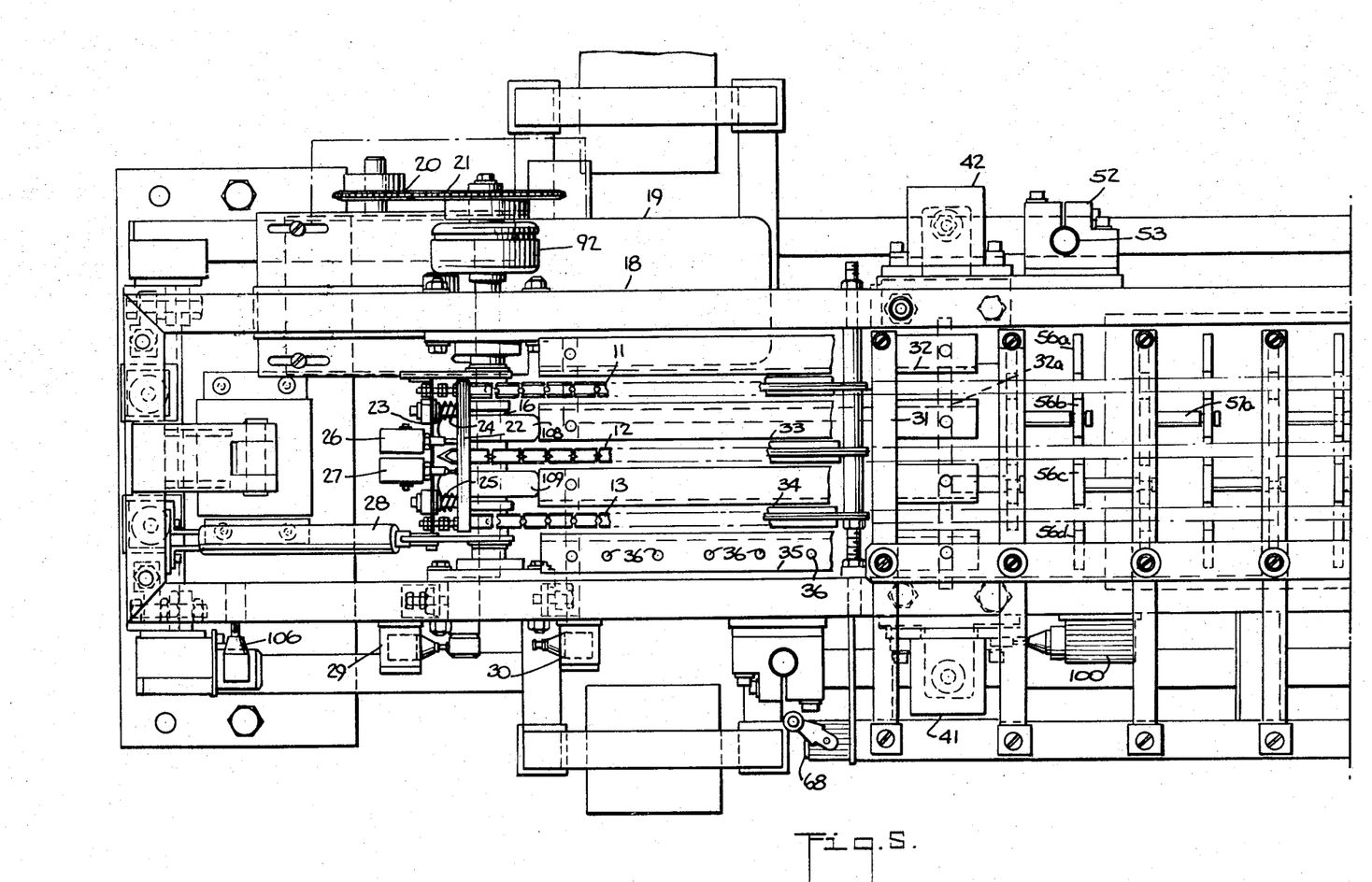
FIG. 5 is a fragmentary plan view of the FIG. 1 apparatus to an enlarged scale.

The means for fixedly positioning one end portion of the tread also includes means for holding the tread stationary longitudinally of the conveyor means. Referring to FIGS. 3 and 5, the means for holding the end portion of the tread stationary comprises a rod 31, preferably of rectangular cross section, and platform bars 32, 33, 34, 35, which have suitable studs 36 therealong, for clamping the tread when the platform bars 32, 33, 34, 35 are raised, as will be explained subsequently.

Figure 4:
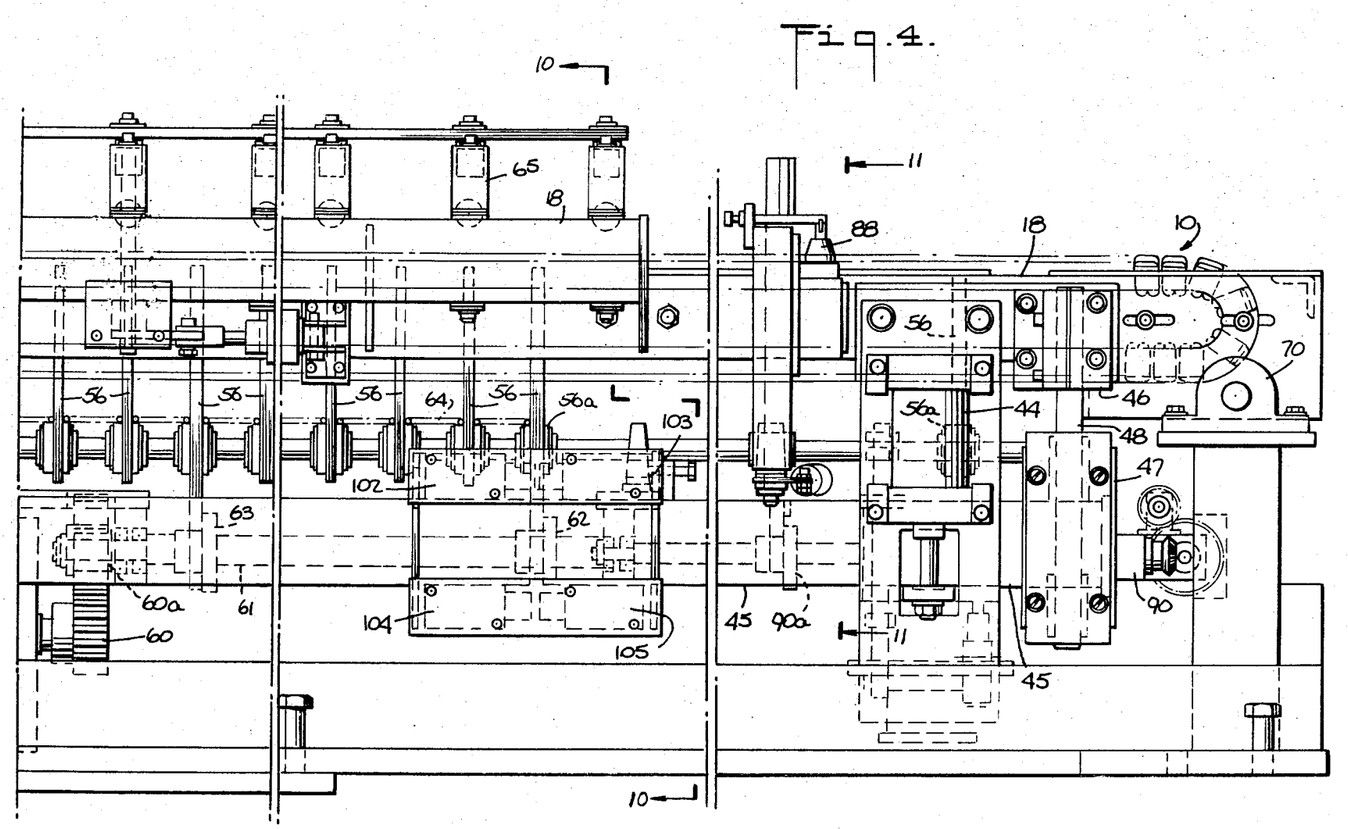
FIG. 4 is a fragmentary view to an enlarged scale of a remaining portion of the FIG. 1 apparatus, to be taken with the FIG. 3 drawing.
Figure 10:
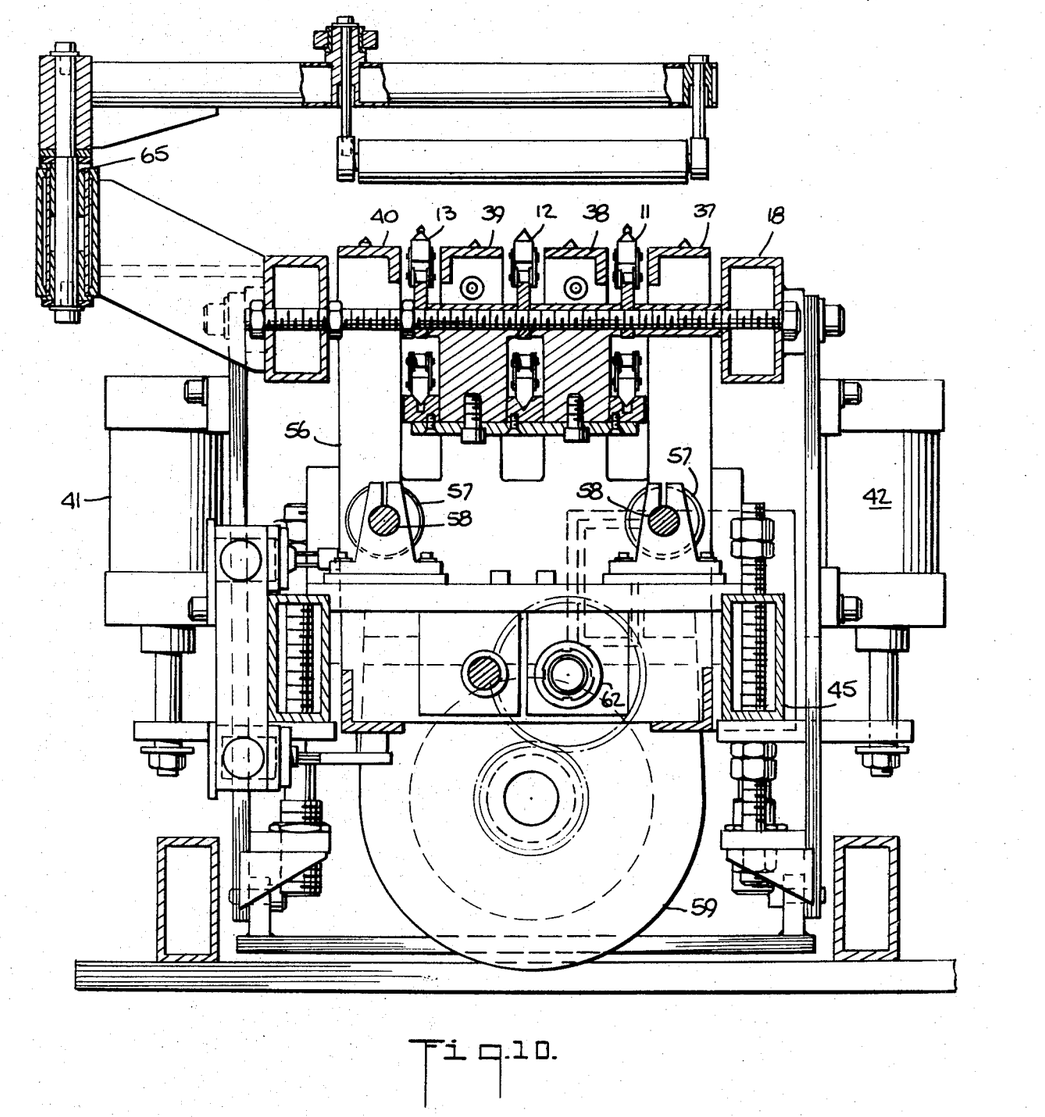
FIG. 10 is a view, in section, to an enlarged scale, taken along line 10—10 of FIG. 4.

The conveying apparatus also includes means having members spaced along the conveyor means for lifting the tread from the conveyor means with the members engaging the tread at spaced points therealong. The lifting means includes the platform bars 32, 33, 34, 35 (FIG. 5) at one end portion of the tread and the platform bars 37, 38, 39, 40 (FIG. 6) at the other end portion of the tread. The platform bars 32, 33, 34, 35 are stationary longitudinally of the conveyor and are mounted on supports 32a, 33a (FIGS. 3 and 5) attached to frame 45. The platform bars 37, 38, 39, 40 are longitudinally movable along frame 45, as may be more clearly seen in FIGS. 4, 6 and 10, which is a view in section taken along the lines 10—10 of FIG. 4. The frame 45 is supported by suitable pneumatic cylinders 41, 42, 43, 44 represented with their piston rods in their extended position in FIGS. 5, 6 and 10. The cylinders 41, 42, 43, 44 are mounted on frame 18. The piston rods of the cylinders are attached to frame 45, as represented in FIGS. 4, 5 and 10. Four guide units each comprising a mounting block 46 mounted on frame member 18 and clamping a rod 48 therein with the rod 48 being slidable within a mounting block 47 mounted on frame member 45, are utilized to guide the vertical displacement of the frame member 45 with respect to the frame member 18 when lifted by the cylinders 41, 42, 43, 44. Three additional guide units 49, 50, 51 (FIG. 3) and 52, 53 (FIG. 5) and 54, 55 (FIG. 6), with the lower mounting blocks of the units 52, 53 and 54, 55 not being shown in FIGS. 5 and 6, are also utilized.

The means for lifting the tread from the conveyor means has members spaced along the conveyor means engaging the tread at spaced points therealong. These members comprise plates 56 represented in FIGS. 3–6, inclusive. Each plate has four finger regions 56a, 56b, 56c, 56d positioned on the sides of the conveyor chains 11, 12 and 13 and extending above the conveyor chains when the plates 56 are lifted. As represented in FIGS. 3 and 4, the plates 56 are mounted on suitable bearings 56a slidable along shafts 58 supported on frame 45. Two similar plates 56 and corresponding bearings 57 support platform bars 37, 38, 39, 40 (FIGS. 4, 6 and 10). As also represented in FIG. 10, the frame 18 supports a guide 110 for the chains 11, 12, 13.

The apparatus also includes means for driving along the conveyor means the members 56 engaging the tread. The driving means includes resilient means separating the members 56 for substantially simultaneously displacing the members 56 along the conveyor means relative to each other and relative to the aforesaid one end portion of the tread to displace the points of engagement of the members 56 with the tread relative to each other and relative to the aforesaid one end portion of the tread. More particularly referring to FIGS. 3 and 4, this driving means comprises a motor 59, gears 60, 60a and a threaded shaft 61 having a nut 62 capable of being adjusted in position thereon. The nut 62 is attached to the one of the members 56 near the other end portion of the tread so that rotation of the shaft 61 displaces that member 56. The driving means also drives a second member 56 positioned approximately halfway between the member 56 attached to nut 62 and a stationary member 32a under the platform bars 32, 33, 34, 35 (FIGS. 3 and 5). To this end, the shaft 61 is threaded in the region of the nut 63 at approximately half the pitch of the thread of the shaft 61 in the region of the nut 62 so that the nut 63 is driven at approximately half the speed of the nut 62.

The apparatus also includes resilient means separating the members 56 with the members 56 engaging the tread preferably being uniformly spaced. More particularly, the resilient means comprises springs 64 separating the members 56. The springs 64 preferably are similar springs with the same spring constants which respond to displacement of the members 56 attached to the nuts 62 and 63 to displace the points of engagement of the tread with adjacent members 56 by amounts such that the length of the tread between adjacent members 56 changes by approximately equal incremental amounts.

Referring for the moment to FIGS. 5 and 6, on each member 56 there is mounted a rod 57a having a portion of reduced diameter extending through the adjacent member 56. These rods act as safety spacer members in the event that the springs 64 separating the members 56 would otherwise cause too much relative displacement between the members 56. The necks of reduced diameter of the spacer members 57 are sufficiently long to allow the members 56 to move relative to each other during normal operation of the appartus.

The apparatus also includes a series of rollers 64 (FIGS. 3, 4 and 10) positioned above various ones of the members 56 for maintaining the tread in contact with the members 56 when the members 56 are in their raised position. The rollers 64, linked by bar 65a, are pivotable about their supports 65 under the control of a pivotable drive member 66 (FIG. 6) actuated by a pneumatic cylinder 67. When the rollers are pivoted away from the chains 11, 12, 13 to their alternate position, the supporting arm 31a for the rod 31 actuates limit switch 68 (FIG. 5).

Referring to FIGS. 3 and 4, the combined assembly of the frames 18 and 45 is pivotally mounted at one end on a support 70 and are supported at the other end by piston rod 71 of a pneumatic cylinder 72 pivotally mounted at its base on a trunnion block 72a so that the frames 18 and 45 can be raised to the position represented in broken line in FIG. 3, as will be explained more fully hereinafter.

Figure 7:
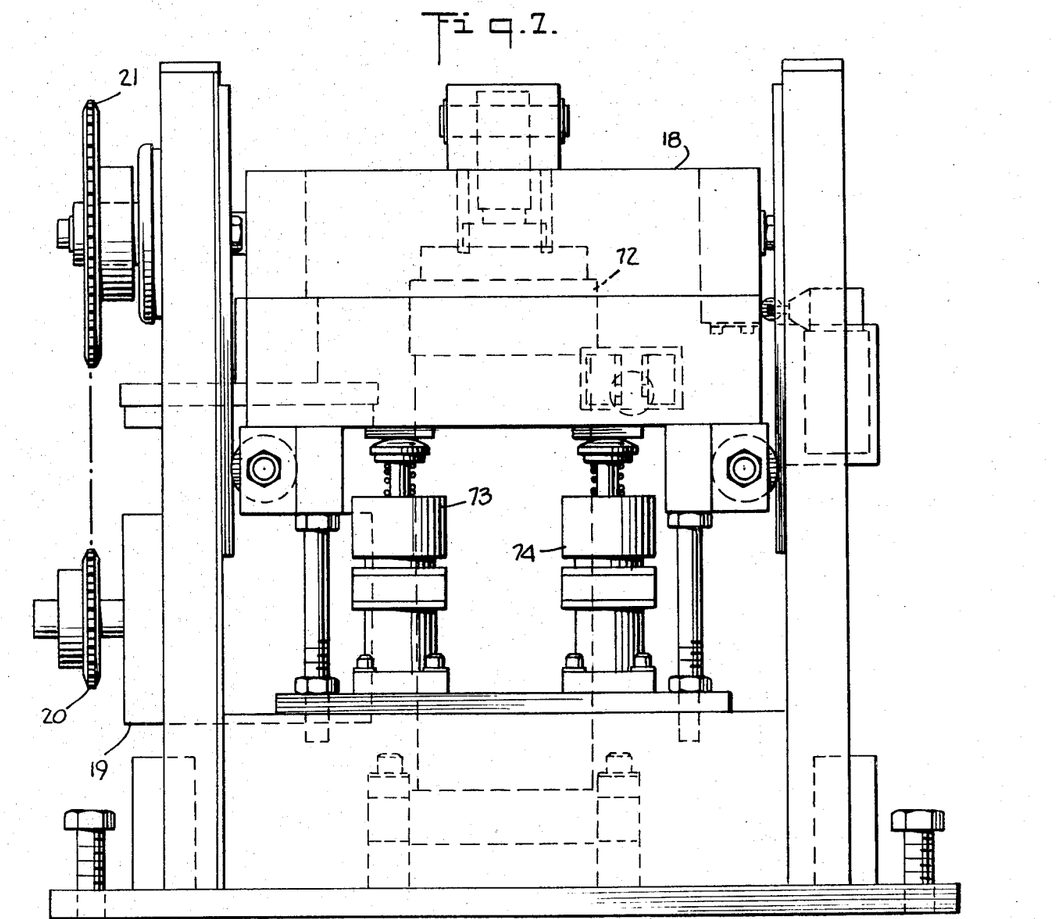
FIG. 7 is an end elevational view of the FIG. 1 apparatus to an enlarged scale.

Referring to FIG. 7, there are represented in elevational view two shock absorber cylinders 73, 74 which cushion the frame 18 when it is returned to the position represented in the drawing.

Figures 9, 11:
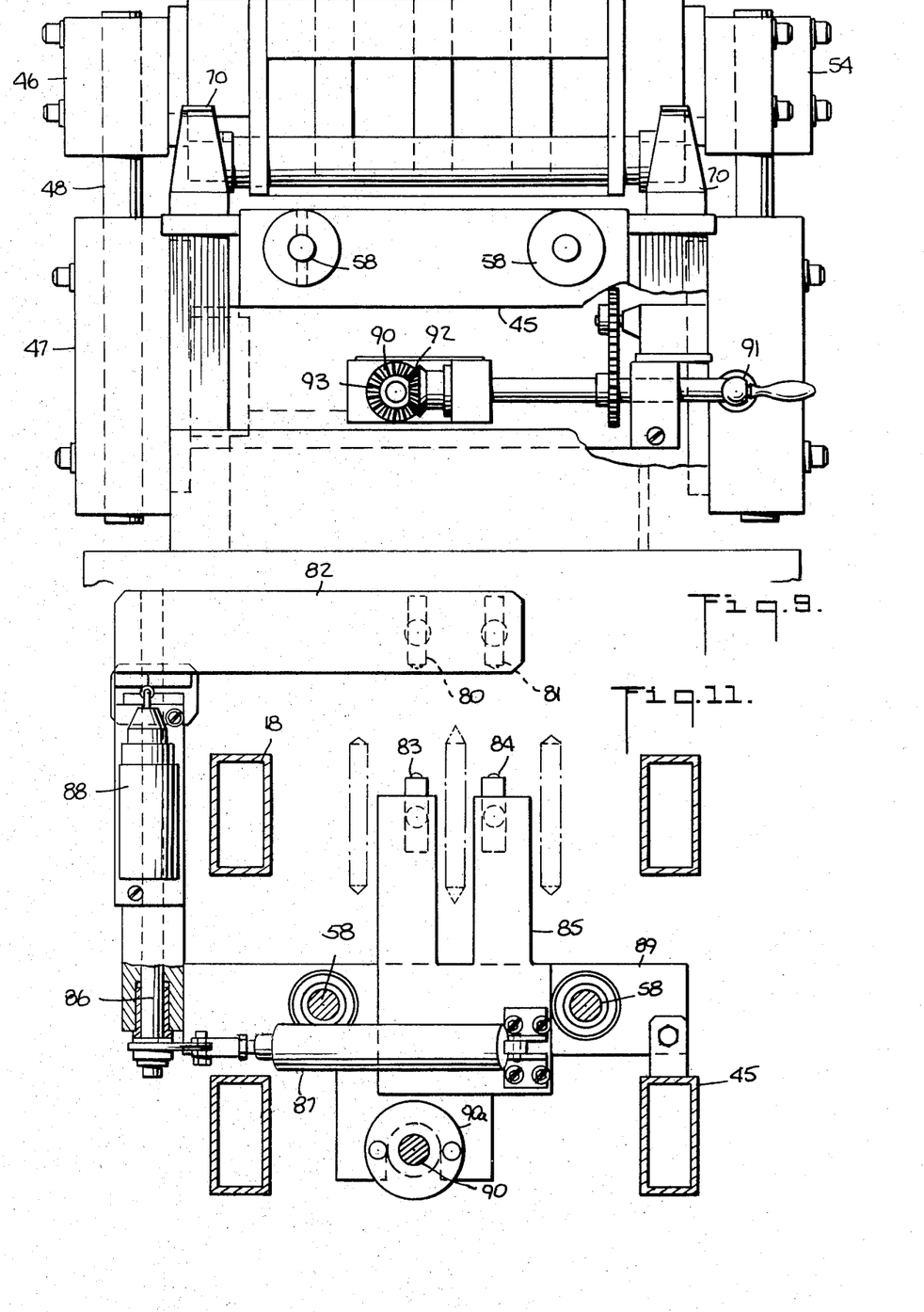
FIG. 9 is a fragmentary end elevational view of FIG. 1 apparatus to an enlarged scale.
FIG. 11 is a view, in section, to an enlarged scale, taken along line 11—11 of FIG. 4.

Referring now more particularly to FIGS. 6, 9 and 11 of the drawings, the apparatus includes means for sensing the length of the tread relative to a reference point. The driving means comprising the motor 59 (FIG. 3) is responsive to the sensing means for causing displacement of the members 56 toward the fixedly positioned end portion of the tread when the tread extends beyond the reference point and away from the fixedly positioned end portion of the tread when the tread does not extend to a reference point. More particularly, the sensing means comprises a pair of light sources 80, 81

(FIG. 11) mounted on an arm 82 and a pair of photocells 83, 84 mounted on a support 85. The photocells 83, 84 are displaced from each other longitudinally along the conveyor by, for example, one-sixteenth inch. Thus, the photocell 83 may be displaced from a reference point corresponding to the desired position of the end of the tread by one thirty-second inch in a direction toward the bar 22 of FIG. 5, and the photocell 84 may be displaced from the desired position of the end of the tread by one thirty-second inch in the opposite direction. The arm 82 is pivotally supported on a rod 86 and may be moved to a position extending approximately lengthwise of the conveyor by the operation of a pneumatic cylinder 87. A suitable limit switch 88 is actuated when the arm is in the position represented in the drawing. The rod 86 and the support 85 are supported by a member 89 which is slidable along the frame 45 under the control of a screw 90 and adjustable nut 90a which positions the support 89 in accordance with the rotation of a hand crank 91 operating gears 92, 93 to position the light sources 80 and 81 and the photocells 83, 84 in accordance with the desired length of the tread.

Figure 12:
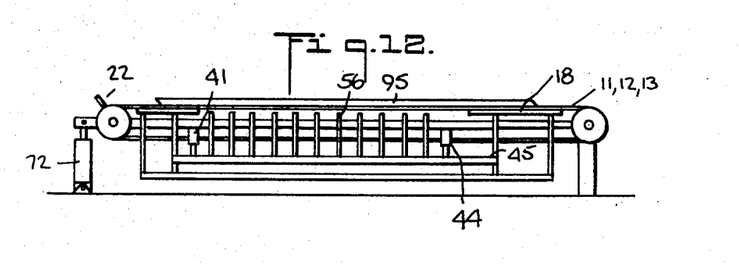
FIGS. 12 to 16, inclusive, are schematic representations of the FIG. 1 apparatus at various stages in the operating sequence thereof.
Figure 13:
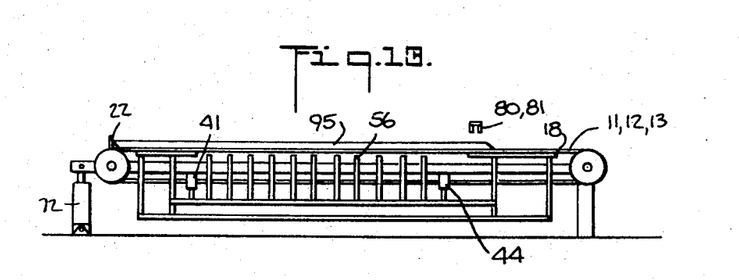

Considering now the operation of the conveying apparatus with reference to FIGS. 3, 4, 5, 6 and 12–16, inclusive, a tread 95 may be placed on the apparatus as represented schematically in FIG. 12. The pneumatic cylinder 28 is then actuated to move the bar 22 to the position represented in FIG. 3 in solid line construction and in FIG. 12. Limit switch 29 is then actuated to indicate the bar 22 is in position. The cylinder 87 is also actuated to move the supporting arm 82 for the light sources 80, 81 into the position represented in FIG. 6, actuating limit switch 88 to indicate that the tread length sensor is in operative position, as also indicated schematically in FIG. 13. The drive clutch 92 is then energized and the motor 19 drives chains 11, 12, 13 and the tread forward until the leading edge of the tread slightly depresses the bar 22 to actuate the limit switch 26, as indicated in FIGS. 5 and 13. The conveyor chains 11, 12, 13 then stop their forward motion. The position of the photocells 83, 84 is determined by the operator by hand adjustment of the crank 91 in accordance with the desired length for the tread prior to placing the tread on the conveyor. Accordingly, if the tread on the conveyor has the desired length when it depresses bar 22, photocell 83 will be blocked and photocell 84 will be energized from the light source 81 to indicate that no adjustment of the length of the tread is necessary. If the tread has the desired length, the operating cycle continues with the energization of the cylinder 28 (FIG. 3) as described subsequently. However, if both photocells 83, 84 are blocked by the end of the tread as indicated in FIG. 13, it is necessary to shrink the tread. If both photocells 83, 84 are energized because the tread is shorter than the desired length, it is necessary to stretch the tread.

Figure 14:
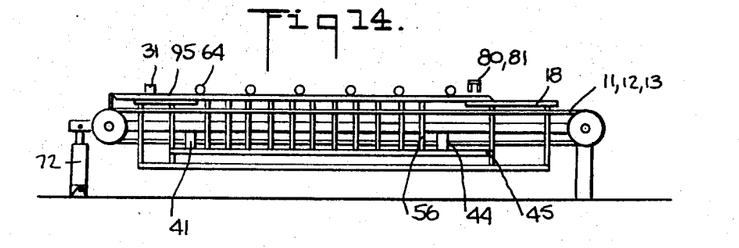

The cylinder 67 (FIG. 6) is then energized to move the rollers 64 and the bar 31 across the tread in the position represented in FIGS. 3–6, inclusive, thereby deactuating limit switch 68. The cylinders 41, 42, 43, 44 are then energized to lift the frame 45, thereby deactuating limit switch 100 and actuating limit switch 101. The shafts 58 supporting the members 56 and the platform bars 32, 33, 34, 35 and 37, 38, 39, 40 are lifted at this time to cause the members 56 to engage the tread at spaced points as indicated in FIG. 14. One end portion of the tread is then fixedly positioned or clamped between the bar 31 and the platform 32, 33, 34, 35. If the member 56 attached to the adjustable nut 62 is at its desired reference position, neither limit switch 102 nor limit switch 103 adjacent thereto is actuated. The adjusting motor 59 then drives the members 56 toward the bar 22 to shorten the tread if the tread is too long and drives the members 56 away from the bar 22 if the tread is too short. Limit switches 104 and 105 (FIG. 4) are actuated only if the member 56 attached to the nut 62 moves more than a predetermined distance from the reference position, thereby serving as safety switches which deenergize the motor 59. The maximum distance the nut 62 may move from the reference position is, for example, one inch in either direction.

When the member 56 attached to the nut 62 moves in a given direction, the member 56 attached to the nut 63 also moves in that direction at approximately half the speed of the member 56 attached to the nut 62. The members 56 between the driving members 56 attached to the nuts 62 and 63 are moved substantially simultaneously with the driving members 56 attached to the nuts 62 and 63 with approximately equal increments of displacement between adjacent members 56 due to the forces exerted by the similar springs 64 separating the members 56. Similarly, the members 56 between the driving member 56 attached to the nut 63 and the stationary member 32a (FIG. 3) are moved substantially simultaneously with the driving member 56 attached to the nut 63 with approximately equal increments of displacement between adjacent members 56 so that approximately equal increments of displacement of the tread engaged with the members 56 occur between adjacent points of engagement of the tread with the members 56. Thus, approximately uniform incremental changes in the length of the tread occur over the major portion thereof. The adjusting motor drives the members 56 in the proper direction to cause the end of the tread to occur between the photocells 83 and 84 to indicate that the tread is at desired length and to stop the adjusting motor.

Figure 15:
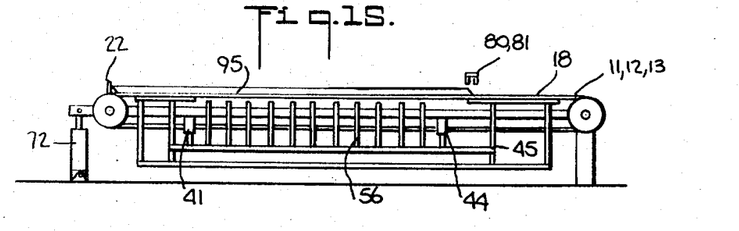

The cylinders 41, 42, 43, 44 are then deenergized to lower the frame 45 placing the tread on the conveyor chains 11, 12, 13 as indicated in FIG. 15. When the frame 45 is lowered limit switch 100 is actuated as represented in FIG. 3. Cylinder 67 (FIG. 6) is then energized to remove the rollers 64 and the bar 31 from over the tread, actuating limit switch 68.

Referring to FIG. 3, the cylinder 28 is then energized to move the bar 22 to its alternate position away from the tread, causing limit switch 30 to be actuated. Referring to FIG. 6, the cylinder 87 is energized to pivot the support arm 82 for the light sources 80, 81 away from the tread, actuating limit switch 88.

The adjusting motor is then energized to reposition the adjusting nuts 63 and 62 so that the members 56 attached thereto are at their reference position, which is indicated by the member 56 attached to nut 62 deactuating both limit switches 102 and 103.

Figure 1:
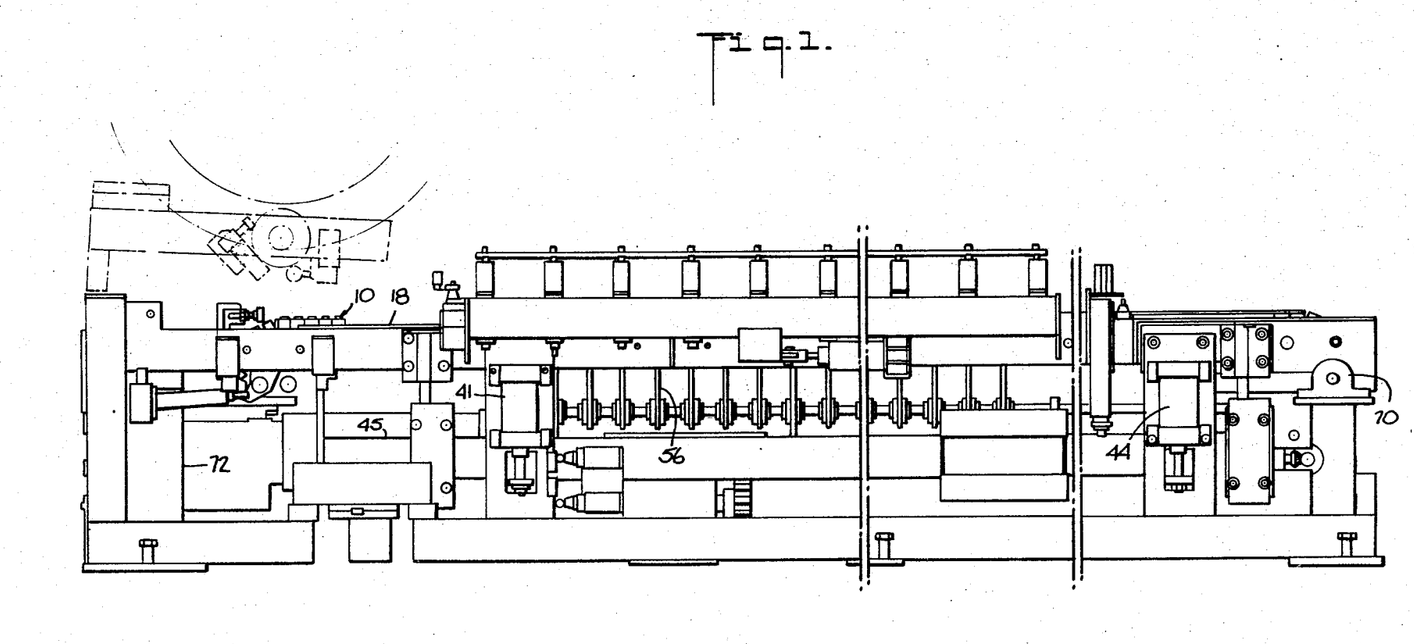
FIG. 1 is a fragmentary elevational view of conveying appratus constructed in accordance with the invention.
Figure 2:
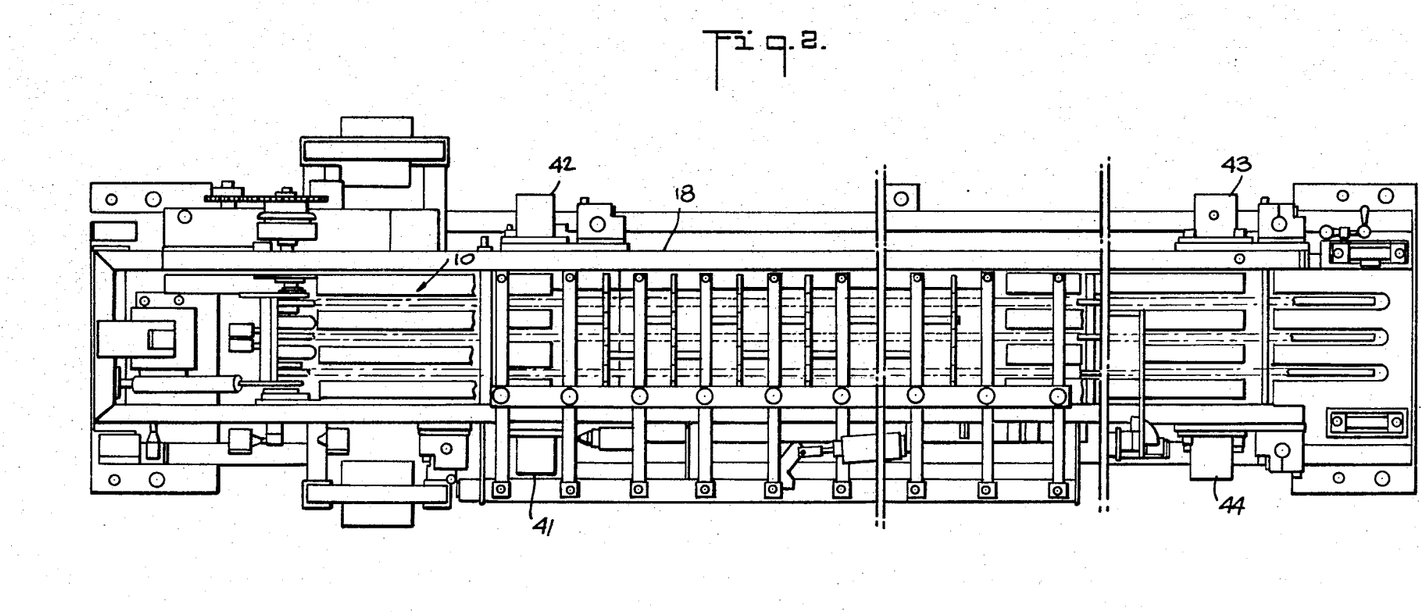
FIG. 2 is a fragmentary plan view of the FIG. 1 apparatus.
Figure 16:
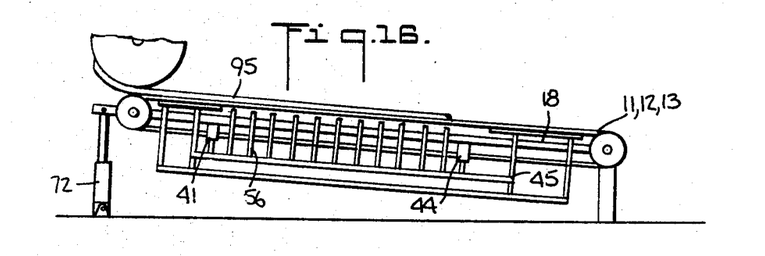

A breaker building drum 107 with breakers thereon and indicated in broken-line construction in FIG. 1 may then be moved into position over the tread. After the drum has been moved to the correct position, the cylinder 72 is energized to raise the conveyor chains 11, 12, 13 and the frames 18 and 45 to the position represented in broken line construction in FIG. 3 and represented in FIG. 16. The motor 19 drives chains 11, 12, 13 and the tread forward. The tread is pushed tangentially onto the freely rotatable breaker building drum, its clutches deenergized, over the breakers thereon by the tread applicator wheels 108, 109 which are also driven by motor 19 to rotate under the tread while the drum makes a single revolution during the application of the tread thereto. After the tread has been applied to the breaker building drum over the breakers thereon, the cylinder 72 is deenergized to lower the frames 18 and 45, actuating limit switch 106 to indicate the frames 18 and 45 have been lowered.

From the foregoing description, it will be understood by those skilled in the art that suitable conventional electrical and pneumatic or hydraulic control systems can be employed in the machine to automatically regulate the various movements described as well as to synchronize the operation with other stages of tire building machines. The electrical and pneumatic systems may also be constructed for manual control by an operator.

While there has been described what at present is believed to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

We claim:

1. Apparatus for conveying a tire tread and for changing the length of the tire tread comprising:
   conveyor means for transporting a tire tread;
   means for fixedly positioning one end portion of said tread lengthwise with respect to said conveyor means;
   means having members spaced along said conveyor means for lifting said tread from said conveyor means with said members engaging said tread at spaced points therealong;
   means for driving said members along said conveyor means and including resilient means separating said members for substantially simultaneously displacing said members along said conveyor means relative to each other and relative to said one end portion of said tread to displace said points of engagement of said members with said tread relative to each other and relative to said one end portion of said tread, thereby changing the length of said tread.

2. Apparatus in accordance with claim 1 which includes means for sensing the length of said tread relative to a reference point and in which said driving means is responsive to said sensing means for causing displacement of said members toward said one end portion of said tread when said tread extends beyond a reference point and away from said one end portion of said tread when said tread does not extend to a reference point.

3. Apparatus in accordance with claim 1 in which said positioning means comprises means actuated by said one end portion of said tread for stopping said conveyor means and means for holding said end portion of said tread stationary longitudinally of said conveyor means.

4. Apparatus in accordance with claim 1 in which said members are uniformly spaced along said conveyor means.

5. Apparatus in accordance with claim 1 in which said driving means comprises a motor and a threaded drive shaft coupled thereto and a driving member adjustably positioned by said drive shaft near the other end portion of said tread and resilient means separating said driving member from said members engaging said tread.

6. Apparatus in accordance with claim 5 in which said tread-lifting means includes a portion which is stationary longitudinally of said conveyor means at said one end portion of said tread and in which said driving means drives said one driving member near said other end portion of said tread at a predetermined speed and drives at approximately half said predetermined speed one of said members engaging said tread and positioned approximately halfway between said one driving member and said stationary portion of said lifting means.

7. Apparatus in accordance with claim 1 in which said tread-lifting means includes a horizontal shaft which is vertically displaceable relative to said conveyor means and in which said members engaging said tread are slidably mounted on said shaft and in which said resilient means separating said members engaging said tread are similar springs.

8. Apparatus in accordance with claim 1 in which said conveyor means, said tread-positioning means, said lifting means, and said driving means are povitally mounted at one end of the conveying apparatus and are displaceable at the other end of the conveying apparatus for raising the tread for tangential application to a freely rotatable drum associated therewith and in which said conveyor means pushes the tread onto said freely rotatable drum.

9. Apparatus in accordance with claim 1 in which said driving means causes approximately equal increments of displacement between adjacent ones of said members.

* * * * *